United States Patent [19]

White et al.

[11] Patent Number: 5,658,506

[45] Date of Patent: Aug. 19, 1997

[54] METHODS OF MAKING SPRAY FORMED RAPID TOOLS

[75] Inventors: Dawn R. White, Ann Arbor; Joseph A. Szuba, Dearborn; Daniel E. Wikosz, Ypsilanti, all of Mich.

[73] Assignee: Ford Global Technologies, Inc., Dearborn, Mich.

[21] Appl. No.: 579,110

[22] Filed: Dec. 27, 1995

[51] Int. Cl.6 .................................................. B05B 3/00
[52] U.S. Cl. .......................... 264/28; 264/219; 264/220; 164/4.1; 164/34; 164/46; 164/516
[58] Field of Search ......................... 264/28, 219, 220; 164/4.1, 34, 46, 516

[56] References Cited

U.S. PATENT DOCUMENTS

| | | | |
|---|---|---|---|
| 3,826,301 | 7/1974 | Brooks | 164/46 |
| 4,066,117 | 1/1978 | Clark et al. | 164/46 |
| 4,447,466 | 5/1984 | Jackson et al. | 427/34 |
| 4,844,144 | 7/1989 | Murphy et al. | 164/35 |
| 4,926,924 | 5/1990 | Brooks et al. | 164/5 |
| 5,126,529 | 6/1992 | Weiss et al. | 219/121.6 |
| 5,189,781 | 3/1993 | Weiss et al. | 29/527.2 |
| 5,203,944 | 4/1993 | Prinz et al. | 156/247 |
| 5,260,009 | 11/1993 | Penn | 264/40.1 |
| 5,370,692 | 12/1994 | Fink et al. | 623/16 |

*Primary Examiner*—Donald E. Czaja
*Assistant Examiner*—Sean Vincent
*Attorney, Agent, or Firm*—Joseph W. Malleck

[57] ABSTRACT

Method of making a rapid tool, comprising: making a plastic pattern of the tool by free form fabrication techniques following a computer aided design, the design having a base and no undercuts taken in a direction perpendicular to base; constructing a ceramic mold as the inverse of the pattern; separating the pattern from the mold by a separating movement in a direction perpendicular to the base to leave a surface defining a casting cavity within the mold; and thermally spraying tool steel particles against the casting cavity surface is a thickness exceeding 1 inch while rapidly cooling the sprayed particles to effect a net shape tool without the need for further working or heat treatment.

10 Claims, 2 Drawing Sheets

METHODS OF MAKING SPRAY FORMED RAPID TOOLS

TECHNICAL FIELD

This invention relates to the rapid making of prototype tools and more particularly to more rapid modes of making stamping dies for shaping sheet metal.

DISCUSSION OF THE PRIOR ART

Heretofore, fabrication of tooling dies has been a time consuming and expensive process. There has not been a smooth transition from product concept to die concept, the tool product has required considerable machining to reach finished or near net shape.

An initial advance uses stereolithography to fabricate a three dimensional wax or plastic pattern in free-form following a computer design; the pattern is invested in a ceramic mold, built up by a series of slurry coatings therearound, and then melted or burned out by heating the mold in a furnace or autoclave. The mold is used in a conventional metal pouring or injection molding operation to create a casting; the mold is destroyed to retrieve the casting (See U.S. Pat. No. 4,844,144). Unfortunately, the casting must be milled, ground or further machined to substantially bring the casting to near net shape. There are also limitations on the sizes of components which can be cast to shape using this method as section thickness is limited to about 1.5 inches.

A further advance in the art is the use of metal spraying to form first and second thin mold shells around a pattern. Spraying is carried out robotically in accordance with the same computer design. The shells are backed-up by supporting material to complete the mold and a release agent is usually applied to the pattern to facilitate separation of the pattern from the mold shells. The mold shells are used conventionally to create a cast metal article (see U.S. Pat. No. 5,189,781). Unfortunately again, the cast article must be machined, milled or ground to near net shape to be used.

Each of the above advances do not create a tool that is near net shape as a result of metal deposition. Thus, more time and more cost must be expended to obtain the desired net shape. Furthermore, the cast metal must be worked to develop more desirable metallurgical properties needed for use as a die element, but even with such working, cast dies will have problems of porosity, microstructure, strength, ductility or residual stresses in some cases. Accordingly, it is an object of this invention to obtain an improved process for more rapidly making prototype stamping tools that create net shape dies that possess desirable physical properties including that for porosity, microstructure, strength, ductility and low residual stresses.

SUMMARY OF THE INVENTION

The invention, that meets the above object, is a method of making a rapid tool, comprising: (a) making a plastic pattern of the tool by free form fabrication techniques following a computer aided design, the design having a base and no undercuts taken in a direction perpendicular to base; (b) constructing a ceramic mold as the inverse of the pattern; (c) separating the pattern from the mold by a separating movement in a direction perpendicular to the base to leave a surface defining a casting cavity within the mold; and (d) spraying atomized tool steel particles against the casting cavity surface in a thickness exceeding 1 inch while rapidly cooling the sprayed particles to effect a net shape tool without the need for further working or heat treatment.

The reason the tool steel particles achieve desired physical properties as a result of thermal spraying without further heat treatment or working is because the spraying process is conducted under carefully controlled conditions so that the deposited metal undergoes accelerated or rapid solidification upon hitting the target and automatically obtains a fine-grained micro structure that is uniform and quite hard.

DETAILED DESCRIPTION AND BEST MODE

Figure 1:
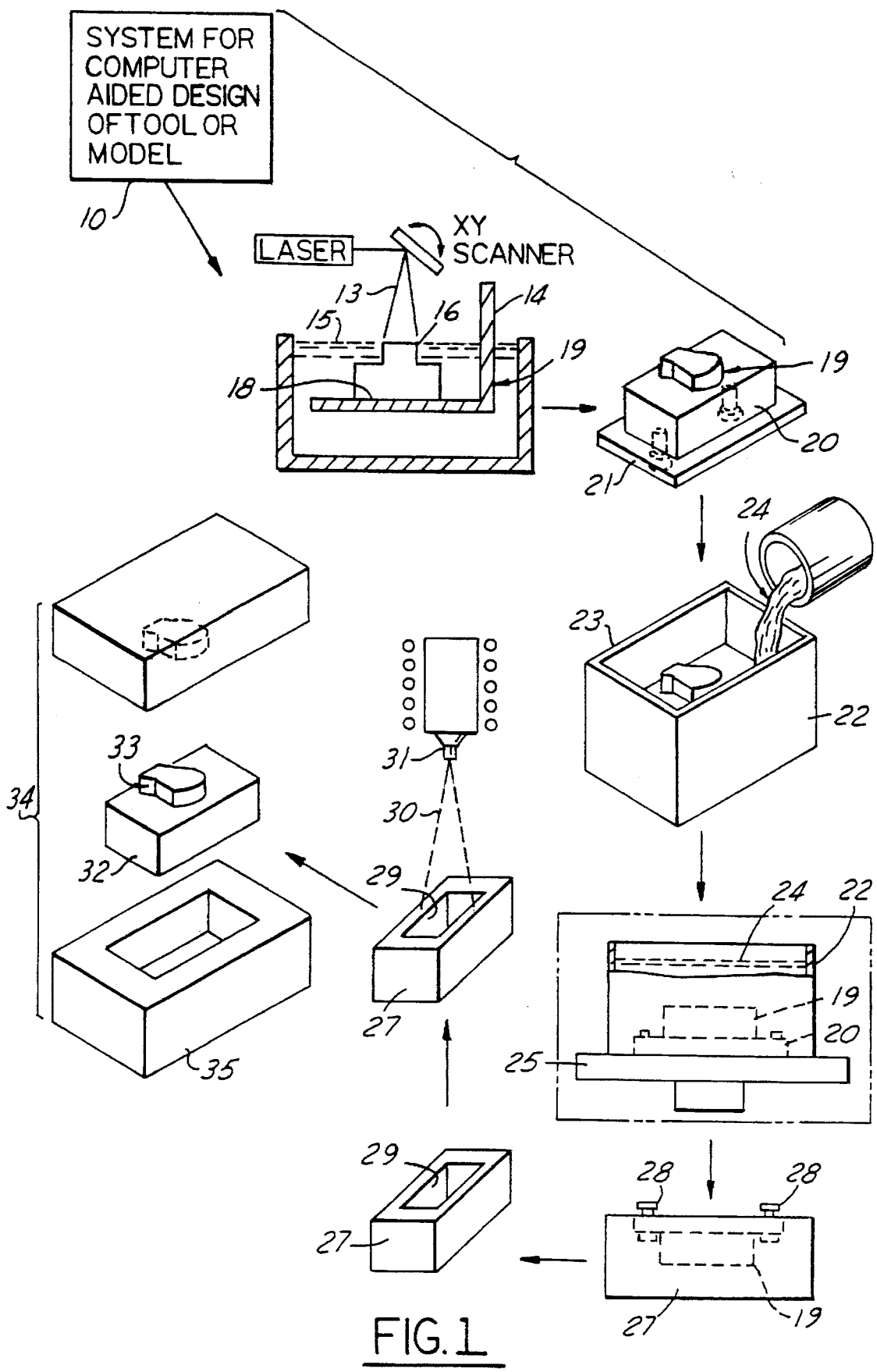
FIG. 1, is a schematic flow diagram of the processing steps of this invention.
Figure 2:
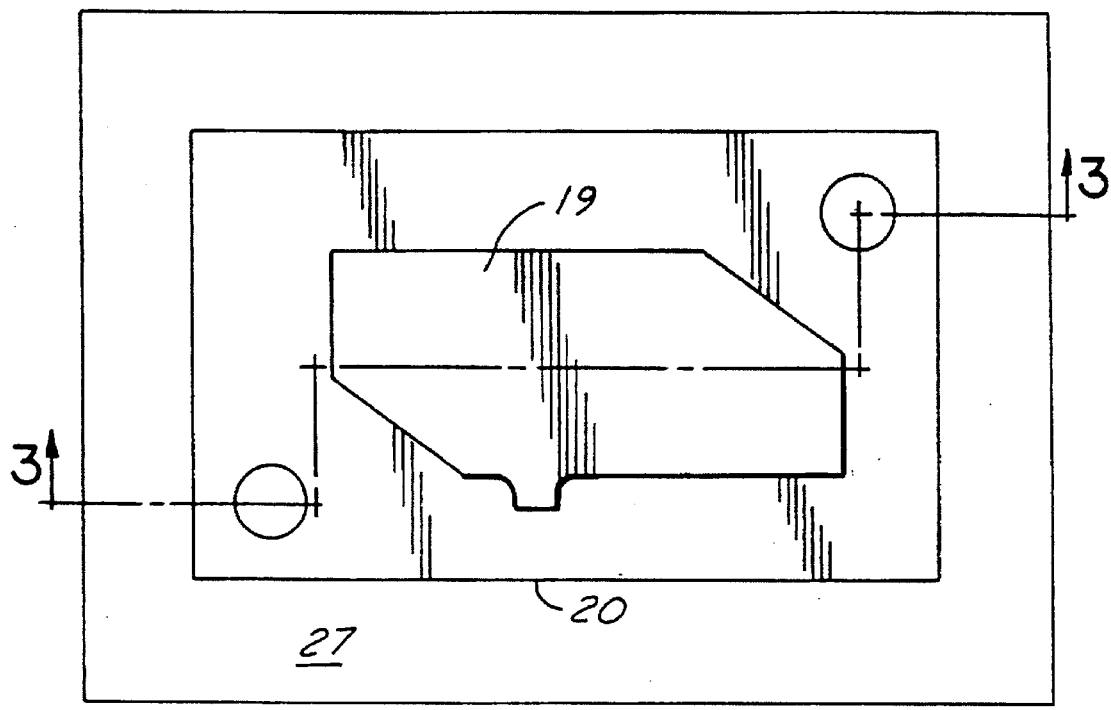
FIG. 2, is a plan view of a stereolithographic die pattern created from a computer aided design, the pattern being surrounded by ceramic mold material away from the pattern base.
Figure 3:
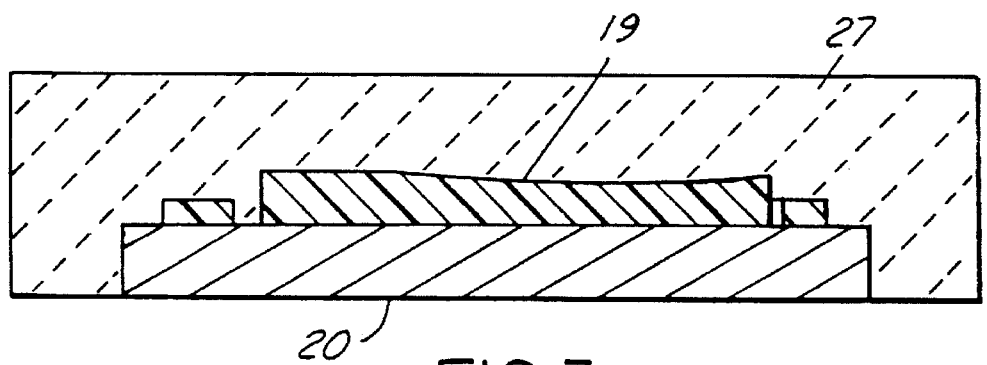
FIG. 3, is a sectional elevational view of the pattern and mold of FIG. 2 taken along line 3—3 thereof.

The present invention involves the development of a unified CAD/CAM tool manufacturing system. In this system, both prototyping and tooling fabrication are based upon compatible solid free form fabrication following a computer aided design and thus the underlying geometric and process models share a common representational scheme. Turning to FIG. 1, the representational scheme is created within a computer system by solid modeling methods. Certain conditions must be accommodated within the CAD/CAM die model such as a completely surfaced representation which can be converted to a STL file for use in some free-form fabrication system such as stereolithography. Once the computer design or model has been created, solid free-form fabrication is utilized to build a three dimensional shape by incremental thin material layers. The fabrication technique can make geometrically complex parts with little difficulty. Free-form fabrication includes selective laser sintering stereolithography (described herein as the best mode), laminated object manufacturing, ballistic powder metallurgy, three dimensional printing, stratified extrusions and other methods.

Stereolithography is a relatively new process which creates plastic prototype models directly from a vat of liquid photo curable polymer through selective solidification using a scanning laser beam. The system is comprised of a vat 11 of photosensitive liquid polymer 12, an x-y scanning ultraviolet laser beam 13, and a z-axis elevator 14 in the vat. The laser beam is focused on the liquid surface 15 to cure the polymer 12, making a solid form 16 wherever the beam scans or intersects the surface. The depth of cure is dosage-dependent. The physical object to be created, as described by the computer designed boundary representation model 17, is first sliced into thin cross-sectional layers along the z-axis. For each slice, the laser trajectory is dictated by the cross-section's boundary and by the bounded region. The platform 18 of the elevator 14 is initially positioned at the surface of the liquid. As the laser draws a cross-section in the x-y plane, a solid layer is formed on the elevator platform. The platform is lowered and then the next layer is drawn in the same way and adheres to the previous layer. The layers are typically between 0.004" and 0.006" thick. A three dimensional plastic object pattern 19 thus grows in the vat, starting at the object's bottom and building to the top. The accuracy of such stereolithographic object is of the order of 0.25 mm (0.010 inches), while surface texture is dependent on the building orientation. The pattern desirably is configured with a supporting platform 20. Support structures may also be added to the plastic pattern to hold it together while it is being built. The object is oriented in the vat and the stereolithography process parameters are planned for the best surface quality and fastest build time.

To create the ceramic inverse pattern the bottom of the 3D stereolithography CAD pattern 19 is adhered to a base metal plate 21 of an open box 22 (preferably of aluminum); the box is open at its top 23. A desired ceramic slurry 24 is poured around the SLA pattern 19 to form a mold 27 and completely covers its geometry to a thickness of greater than one inch at the thinnest wall section. Entrapped air is minimized by vibrating the box and slurry contained therein on a table 25, preferably in a vacuum chamber 26. Depending on the character of the ceramic slurry 24 that is employed, the mold 27 is either (i) air dried, removed and then fired to finally cure it, or (ii) the ceramic slurry is freeze cast to temperatures around $-30°$ F. and the pattern removed prior to the ceramic mold thawing out, or (iii) the ceramic slurry is dried and, then the pattern burned out while the ceramic is undergoing curing. The latter is conventional investment casting and is not desirable because of the possibility of shell cracking, lower shell strength and poor geometric compatibility with the spray process. Freeze casting is preferred.

The pattern 19 is removed from the cured ceramic mold 27 by installing screws 28 in the back of the pattern 19 and pulling the pattern out physically. Or a stationary plate may be used which the extraction screws extend through; by turning the screws inward they pull against the stationary plate and also pull the pattern 19 away from the ceramic mold 27.

The ceramic mold material is selected to provide a good surface finish (such as 1-4 microns), good thermal shock resistance value at temperatures of $1800°-2400°$ F., able to withstand up to $2,400°$ F. temperatures, have compressive strengths of about 9,000 psi and possess a low shrinkage (less than 0.3 percent) and possess low thermal expansion (1.0-4.0 E-6/degree F.) and have no reaction to molten metal. The ceramic is selected to be capable of withstanding a molten metal environment and have a very smooth surface with good dimensional accuracy. Materials useable for this invention include dental ceramics, investment casting slurries, fused silica and freeze cast alumina.

The open ceramic mold 27 is then used as a receptor for a metal spray forming step, such as melt atomization or arc or plasma spraying. Such step is desirably carried out by the osprey process wherein a semi-solid slurry 30 of hardenable steel is sprayed from an induction heated nozzle supply 31 and is impelled against the mold surface 29 with a high velocity due to the high pressure gases that automize the molten fluid. Metal droplets are formed from a melt that is atomized by gas (not from wire or powder). Continuous spraying is carried out to build up a layer that exceeds at least 1 inch in thickness, at its thinnest section.

Metals usable for the purpose of this invention include metals that have a high hardness as-deposited. These include certain tool steels such as A2 and plain carbon steel with (0.8% carbon by weight) as well as maraging steels. An A2 tool steel typically contains 1.0% by weight carbon, 1.0% Mo, and 5.0% chromium. Such a tool steel usually must be hot worked to develop physical properties necessary for a die form. However, this hot working is eliminated by the osprey process because a fine grained microstructure is obtained in the as sprayed condition. Other alloy steels that are air hardenable, will have a carbon content of between 0.5-1.35 percent.

Maraging steels are age-hardenable because of the presence of a martensitic microstructure. Such steels contain about 18% nickel, 7-9.5% cobalt, 3-5% molybdenum and 0.1-0.8% titanium. Very little carbon is present. Such maraging steels are typically annealed at about $1,500°$ F. and upon cooling transform to martensite (FeNi microstructure) and thereafter the steel is aged at about $900°$ F. for about three hours to produce physical properties such as a tensile strength of about 250,000 psi, an elongation in 2 inches of about 7%, and a charpy impact value of about 12 foot pounds at $320°$ F. Maraging steels are difficult to machine and are seldom used for tooling, but can be readily spray formed to produce a desirable microstructure.

The density of the sprayed metal in accordance with this invention, will vary depending on the spray process used, but is generally between 95-99.5%. If the tool is made by the osprey process, the density will be 99.5% and if it is made by an arc spraying process such as twin arc, the density will be about 95%. The osprey process provides virtually no porosity in the as deposited metal because of the use of a semi-solid slurry that constantly feeds the solidifying tool material. The spraying process will result in little or no shrinkage because of such continuous feeding of deposited material. The spraying process results in a finer microstructure which produces improved strength, toughness and ductility over metals that are produced by typical casting techniques. The improvement in strength is usually about 25% above that of a casting and the ductility improvement is generally 50-100%.

The thermal spraying process of this invention avoids high residual stresses or at least produces lower residual stresses in the deposited metal because a controlled cooling process leads to control of transformation induced stresses, producing a neutral residual stress state in the finished part. In the osprey process, the lower residual stresses result because of the semi-solid nature of the material deposited; this allows for slow cooling after rapid solidification producing much lower residual stresses. The spray cools at rates of up to $10^{6°}$ K./second during droplet flight, but the solidified tool will cool from $1800°$ F. to room temperature over a period of two or more hours depending on the tool size after consolidation is complete.

If twin arc spraying is utilized to deposit the sprayed metal, residual stresses are controlled by regulating the cooling rate through control of the metal deposit and gas flow rates, thereby regulating the martensitic transformation. Thus, geometric accuracy and low residual stresses in the as deposited tool are achieved.

The completed tool 33 may then be mounted in a die set 34 and used to stamp parts just like any other stamping tool. Some machining may be required to square up the base 32 of the tool and obtain correct orientation when placed in part 35 of the die-set. Orientation of the base is critical in getting the tools oriented properly because the tool surfaces have complex shapes which must fit exactly. The rapid tooling process of this invention creates very accurate geometrically curved surfaces, but some slight linear machining may be necessary to the die base to produce a tool which can be mounted correctly. The best and faster way to obtain linear straight cuts and surfaces, that are useful to orientation, is by a subsequent machining rather than to rely upon the rapid tooling technique. The rapid tool may be used at least up to about 3000 stamping operations.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of making a rapid tool, comprising:
   (a) making a plastic pattern of the tool by free-form fabrication techniques following a computer aided design, said design having an exposed base with no undercuts taken in a direction perpendicular to the base;
   (b) constructing a ceramic mold as the inverse of the pattern;
   (c) separating the pattern from the mold by a separating movement in a direction perpendicular to the base to leave a ceramic surface defining a casting cavity within the mold; and
   (d) thermally spraying tool steel particles against said casting cavity ceramic surface in a thickness exceeding 1 inch while rapidly cooling the sprayed particles to effect a near net shape tool possessing a hardness of at least HRc 40, without need for further working or heat treatment.

2. The method as in claim 1 in which step (c) is carried out by use of a ceramic that is cured at room temperature or is cured by freezing or firing.

3. The method as in claim 1, in which the metal particles used in step (d) consist of semi-solid liquid particles with a liquid-solid fraction ranging from 20%–75%.

4. The method as in claim 1, in which step (d) is carried out at a deposition rate of about 1 pound per second.

5. The method as in claim 1, in which the physical tool part properties resulting from the completion of step (d) include a tensile strength of at least 25% more than a comparable casting, a ductility of 50%–100% or more comparable casting, and a microstructure characterized by five, uniform grains.

6. The method as in claim 5, in which said physical properties further include a resistance to cracking, a porosity of 5 percent or less accompanied by little or no shrinkage, and low residual stresses.

7. The method as in claim 1, in which said tool steel particles are selected from the group comprising plain carbon tool steels and maraging tool steels.

8. The method as in claim 1, in which step (d) is carried out by either the osprey process or twin arc spraying.

9. The method as in claim 1, in which the ceramic used for step (c) is selected from the group consisting of dental ceramics, investment casting slurries, fused silica, freeze cast alumina, and advanced cement based materials.

10. The method as in claim 1 in which said pattern is reusable after step (c) and the sprayed tool is a stamping tool.

* * * * *